US011625094B2

(12) United States Patent
Aleem et al.

(10) Patent No.: US 11,625,094 B2
(45) Date of Patent: Apr. 11, 2023

(54) EYE TRACKER DESIGN FOR A WEARABLE DEVICE

(71) Applicant: GOOGLE LLC, Mountain View, CA (US)

(72) Inventors: Idris Syed Aleem, Kitchener (CA); Andrew Logan, Waterloo (CA)

(73) Assignee: GOOGLE LLC, Mountain View, CA (US)

( * ) Notice: Subject to any disclaimer, the term of this patent is extended or adjusted under 35 U.S.C. 154(b) by 70 days.

(21) Appl. No.: 17/302,487

(22) Filed: May 4, 2021

(65) Prior Publication Data

US 2022/0357794 A1 Nov. 10, 2022

(51) Int. Cl.
*G06F 3/01* (2006.01)
*G06T 19/20* (2011.01)
*G06T 17/00* (2006.01)

(52) U.S. Cl.
CPC .............. *G06F 3/013* (2013.01); *G06T 17/00* (2013.01); *G06T 19/20* (2013.01); *G06T 2219/2012* (2013.01); *G06T 2219/2016* (2013.01); *G06T 2219/2021* (2013.01)

(58) Field of Classification Search
CPC . G06F 3/013; G06T 19/20; G06T 2219/2012; G06T 2219/2016; G06T 17/00; G06T 2219/2021

See application file for complete search history.

(56) References Cited

U.S. PATENT DOCUMENTS

| 10,684,467 | B2 * | 6/2020 | Gibbs | G06V 20/20 |
| 2005/0162419 | A1 | 7/2005 | Kim et al. | |
| 2014/0184496 | A1 * | 7/2014 | Gribetz | G06F 3/04842 345/156 |
| 2016/0062152 | A1 | 3/2016 | Fonte et al. | |
| 2020/0229969 | A1 * | 7/2020 | Fix | A61B 3/14 |
| 2020/0368616 | A1 * | 11/2020 | Delamont | A63F 13/213 |

OTHER PUBLICATIONS

Amft, et al., "Making Regular Eyeglasses Smart", IEEE CS; Pervasive Computing; vol. 14, Iss. 3 (https://ieeexplore.ieee.org/document/7140688), Jun. 30, 2015, 12 pages.

Niswar, et al., "Virtual Try-On of Eyeglasses Using 3D Model of the Head", IEEE CS, Jul.-Sep. 2015, 4 pages.

* cited by examiner

*Primary Examiner* — Muhammad N Edun
(74) *Attorney, Agent, or Firm* — Brake Hughes Bellermann LLP

(57) ABSTRACT

According to an aspect, a method for designing an eye tracker on a wearable device includes selecting a first three-dimensional (3D) model of at least a head of a person, selecting a second 3D model of a wearable device, positioning a synthetic eye within the first 3D model, positioning an eye tracker component at a first location on the second 3D model, the eye tracker component including at least one of an eye tracker sensor or a light source, moving at least one of the first 3D model or the second 3D model such that at least a portion of the first 3D model contacts at least a portion of the second 3D model, and generating performance data with the eye tracker component positioned at the first location on the second 3D model.

20 Claims, 8 Drawing Sheets

EYE TRACKER DESIGN FOR A WEARABLE DEVICE

TECHNICAL FIELD

This description generally relates to eye tracker design for a wearable device, and, in particular to, positioning one of more eye tracker components on a wearable device that can increase the accuracy of an eye tracker across a number of users.

BACKGROUND

Wearable devices may include head-mounted devices (e.g., smartglasses, augmented reality (AR) devices, etc.), earbuds, watches, fitness trackers, cameras, body sensors, etc. A wearable device may include an eye tracker that can track a position of a person's eye, which can be used as an input for one or more applications of the wearable device.

SUMMARY

According to an aspect, a wearable device design system includes at least one processor and a non-transitory computer-readable medium storing executable instructions that when executed by the at least one processor cause the at least one processor to select a first three-dimensional (3D) model of at least a head of a person from a head sample database, select a second 3D model of a wearable device from a wearable device database, position a synthetic eye within the first 3D model, position an eye tracker sensor at a first location on the second 3D model, move at least one of the first 3D model or the second 3D model such that at least a portion of the second 3D model contacts at least a portion of the first 3D model, and generate performance data with the eye tracker sensor positioned at the first location on the second 3D model, where the performance data includes information associated with performance of an eye tracker using the synthetic eye.

According to some aspects, the wearable device design system may include one or more of the following features (or any combination thereof). The performance data may include an amount of the synthetic eye that is visible via the eye tracker sensor. The executable instructions include instructions that when executed by the at least one processor cause the at least one processor to move the eye tracker sensor from the first location to a second location and re-generate the performance data with the eye tracker sensor positioned at the second location. The executable instructions include instructions that when executed by the at least one processor cause the at least one processor to adjust a viewing angle of the eye tracker sensor and re-generate the performance data with the eye tracker sensor according to the adjusted viewing angle. The executable instructions include instructions that when executed by the at least one processor cause the at least one processor to adjust a synthetic eye parameter of the synthetic eye model within the first 3D model. The synthetic eye parameter includes at least one of size of eye, size of pupil, color of iris, shape of the iris or shape of cornea. The executable instructions include instructions that when executed by the at least one processor cause the at least one processor to store the performance data in a performance database, re-generate performance data for other head samples in the head sample database, and identify a location of the eye tracker sensor based on an analysis of the performance database. The executable instructions include instructions that when executed by the at least one processor cause the at least one processor to position a light source at a second location on the second 3D model, where the performance data is generated with the eye tracker sensor positioned at the first location and the light source positioned at the second location. /the second 3D model includes a prescription lens, where the executable instructions include instructions that when executed by the at least one processor cause the at least one processor to adjust one or more parameters of the prescription lens The wearable device includes smartglasses configured to project a display, wherein the eye tracker sensor is positioned on a frame of the smartglasses at the first location.

According to an aspect, a method for designing an eye tracker on a wearable device includes selecting a first three-dimensional (3D) model of at least a head of a person from a head sample database, selecting a second 3D model of a wearable device from a wearable device database, positioning a synthetic eye within the first 3D model, positioning an eye tracker component at a first location on the second 3D model, the eye tracker component including at least one of an eye tracker sensor or a light source, moving at least one of the first 3D model or the second 3D model such that at least a portion of the first 3D model contacts at least a portion of the second 3D model, and generating performance data with the eye tracker component positioned at the first location on the second 3D model, where the performance data includes information associated with performance of an eye tracker using the synthetic eye.

According to some aspects, the method may include one or one of the above/below features (or any combination thereof). The performance data includes an amount of the synthetic eye that is visible via the eye tracker sensor. The method may include adjusting a viewing angle of the eye tracker sensor and re-generating the performance data with the eye tracker sensor according to the adjusted viewing angle. The method may include adjusting a synthetic eye parameter of the synthetic eye model within the first 3D model, where the synthetic eye parameter includes at least one of size of the synthetic eye, size of a pupil, shape or size of an iris, and/or color of the iris (and/or shape of cornea). The method may include storing the performance data in a performance database, re-generating performance data for other head samples in the head sample database, and identifying a location of the eye tracker component based on an analysis of the performance database. The method may include adjusting one or more parameters of prescription lens associated with the wearable device.

According to an aspect, a non-transitory computer-readable medium storing executable instructions that when executed by at least one processor cause the at least one processor to select a first three-dimensional (3D) model of at least a head of a person from a head sample database, select a second 3D model of a wearable device from a wearable device database, position a synthetic eye within the first 3D model, the synthetic eye being an eye-image having image data representing a pupil, position an eye tracker sensor at a first location on the second 3D model, move at least one of the first 3D model or the second 3D model such that at least a portion of the second 3D model contacts at least a portion of the first 3D model, and generate performance data with the eye tracker sensor positioned at the first location on the second 3D model, where the performance data includes an amount of the pupil of the synthetic eye that is visible via the eye tracker sensor.

According to some aspects, the non-transitory computer-readable medium may include one or more of the following features (or any combination thereof). The executable instructions include instructions that when executed by the at least one processor cause the at least one processor to move the eye tracker sensor from the first location to a second location and re-generate the performance data with the eye tracker sensor positioned at the second location. The executable instructions include instructions that when executed by the at least one processor cause the at least one processor to adjust a synthetic eye parameter of the synthetic eye model within the first 3D model, the synthetic eye parameter including at least one of size of eye, size of pupil, color of iris, or shape of the iris (and/or shape of cornea). The executable instructions include instructions that when executed by the at least one processor cause the at least one processor to store the performance data in a performance database, re-generate performance data for other head samples in the head sample database, and identify a location of the eye tracker sensor based on an analysis of the performance database.

The details of one or more implementations are set forth in the accompanying drawings and the description below. Other features will be apparent from the description and drawings, and from the claims.

DETAILED DESCRIPTION

Figure 1A:
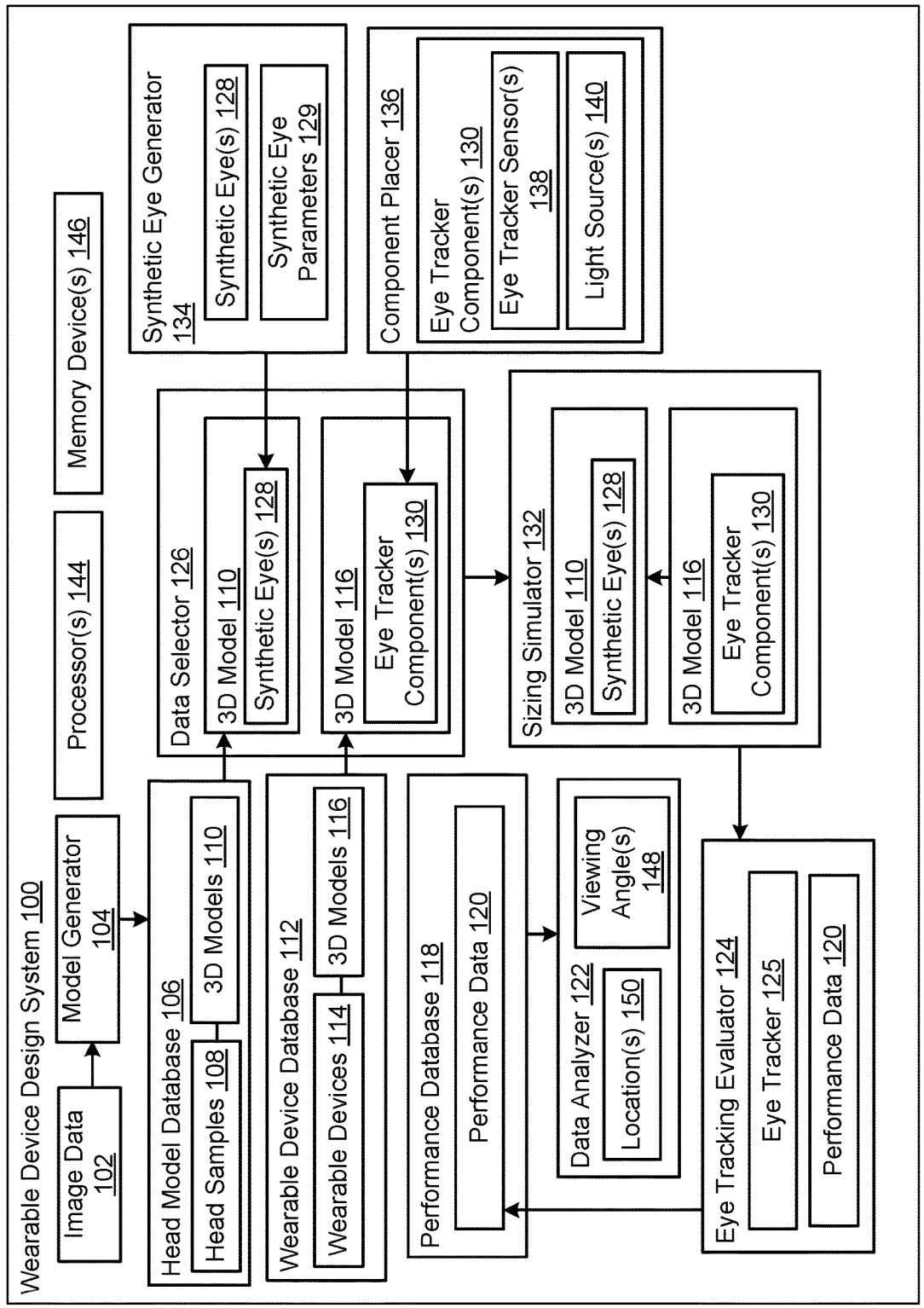
FIG. 1A illustrates a wearable device design system according to an aspect.

An eye tracker may include several components, which are located at certain locations on the structure of the wearable device. However, different people have different head or facial features, where the eye tracking mechanism may have better accuracy on some people but less accuracy on other people. For example, a first person may wear a wearable device that has an eye tracker, and the eye tracker may properly track the first person's eye movement. However, a second person may wear the same wearable device, but the eye tracker may have performance issues with tracking the second person's eye movement (e.g., the eye tracker's sensors may not be able to fully view the second person's eye). In some examples, it may be difficult to determine the position of the individual components for an eye tracker that can operate across a wide variety of users.

This disclosure relates to a wearable device design system configured to design an eye tracker for use on a wearable device that can increase the performance (e.g., accuracy) of the eye tracker across a number of users. In some examples, the wearable device includes a head-mounted display device. In some examples, the wearable device includes smartglasses. An eye tracker is a device for measuring eye position and/or eye movement. The eye tracker may include a plurality of eye tracker components that are positioned on the wearable device to enable the eye tracker to measure the eye position and/or eye movement. The eye tracker components may include one or more eye tracker sensors and one or more light sources. The eye tracker components may be positioned at different locations on the wearable device. In the case of smartglasses, the eye tracker components may be positioned on different locations of the frame. The placement of the eye tracker components on the wearable device may affect the performance of the eye tracker.

The wearable device design system may determine the number and position of the eye tracker components on the wearable device in a manner that can increase the performance of the eye tracker across a number (e.g., a wide number) of users. For example, the wearable device design system may select a three-dimensional (3D) model representing at least a head of a person from a head model database. The head model database may store 3D representations of a plurality of different head samples. Also, the wearable device design system may select a 3D model representing a wearable device from a wearable device database. The wearable device database may store 3D representations of a plurality of wearable devices (e.g., different models of smartglasses). The wearable device design system includes a synthetic eye generator that generates and positions a synthetic eye within the head sample's 3D model. A synthetic eye may be a representation of an eye-image having visible features of a realistic eye such as a pupil, iris, cornea, and/or sclera.

The wearable device design system may position one or more eye tracker components on the wearable device's 3D model (e.g., programmatically or by a user). In some examples, a user may use a component placer to position one or more eye tracker sensors and/or one or more light sources on the wearable device's 3D model. The wearable device design system includes a sizing simulator that simulates a placement of the wearable device's 3D model on the head sample's 3D model. For example, the sizing simulator may receive the wearable device's 3D model and the head sample's 3D model and then position the wearable device's 3D model on the head sample's 3D model such that they contact each other. In some examples, the sizing simulator may determine the contact points between the wearable device's 3D model and the head sample's 3D model.

The wearable device design system generates performance data that includes information associated with an evaluation of the eye tracker. For example, the wearable device design system may evaluate an accuracy of the eye tracker with the eye tracker components positioned on the wearable device. The performance data may include any type of data that indicates the accuracy of detecting and/or tracking the position of the synthetic eyes. In some examples, the performance data includes information indicating an amount of the synthetic eye that is visible via the eye tracker sensor(s). For example, if the eye tracker sensor(s) is/are able to capture a substantial portion of the synthetic eye, the accuracy of the eye tracker may be improved. In some examples, the performance data includes signal levels such the presence (or level) of dim spots, obstructions (e.g., clippings), and/or illumination levels. In some examples, the signal levels include a signal level relating to an obstruction between the camera and the eye, which can be caused by eyelashes or the angle of the camera having some part of the device (e.g., glasses) obstructing the field of view. In some examples, the performance data includes the amount of eyelids (e.g., upper and/or lower) that is obstructing the iris/pupil. In some examples, the eye tracking evaluator may store the performance data in a performance database.

The component placer may move the eye tracker components to different locations (e.g., programmatically or directed by the user), and the wearable device design system may re-generate the performance with the eye tracker components at the new locations. In some examples, the component placer may adjust the viewing angle of one or more of the eye tracker sensors (e.g., programmatically or directed by the user) and re-generate the performance data using different viewing angles. In some examples, the synthetic eye generator may adjust one or more synthetic eye parameters such as size of the synthetic eye, size of the pupil, shape/size of the iris, and/or color of the iris (and/or shape of cornea). The wearable device design system may evaluate the performance of the eye tracker using different values for the synthetic eye parameters. In some examples, the wearable device includes prescription lens (e.g., corrective lens) and the component placer may be configured to adjust the parameters of the prescription lens to meet different types of prescriptions, and the wearable device design system may evaluate the performance of the eye tracker using different lens parameters.

The wearable device design system is configured to select other head samples from the head model database and generate performance data for the eye tracker using the operations as described above. In some examples, the wearable device design system is configured to analyze the performance data in the database across the different head samples and determine the position (and/or viewing angle) of the eye tracker sensors and/or light sources in a manner that increases the performance of the eye tracker across a plurality of head samples.

Figure 1B:
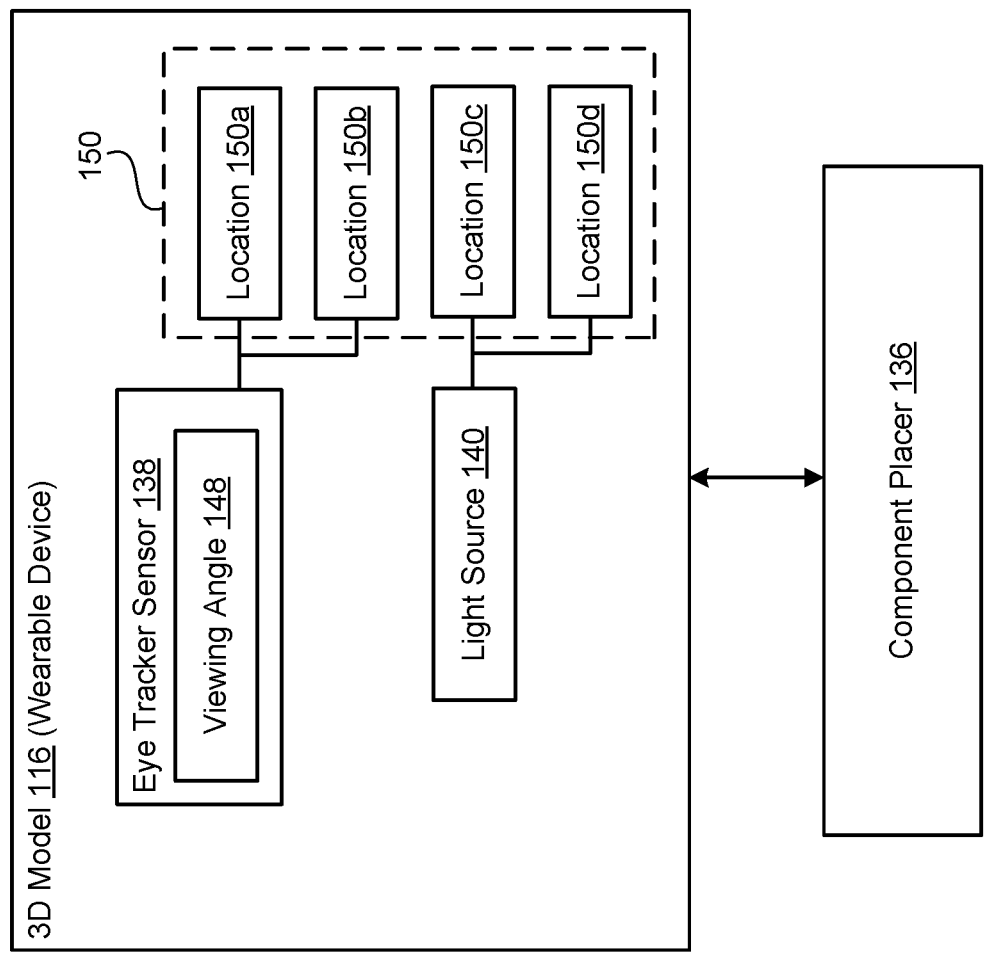
FIG. 1B illustrates a three-dimensional (3D) model associated with a wearable device according to an aspect.

FIGS. 1A and 1B illustrate a wearable device design system 100 according to an aspect. The wearable device design system 100 is configured to design an eye tracker 125 for use on a wearable device 114 that can increase the performance (e.g., accuracy) of the eye tracker 125 across a number of users.

A wearable device 114 may include one or more devices, where at least one of the devices is a display device capable of being worn on or in proximity to the skin of a person. The wearable device 114 may include a head-mounted display (HMD) device such as an optical head-mounted display (OHMD) device, a transparent heads-up display (HUD) device, an augmented reality (AR) device, or other devices such as goggles or headsets having sensors, display, and computing capabilities. However, the embodiments are not limited to head-mounted display devices, where the wearable device 114 may include any type of wearable device such as earbuds, watches, fitness trackers, cameras, body sensors, and/or any type of computing device that can be worn on the skin of a person or in proximity to the skin of the person.

The wearable device 114 may include smartglasses. Smartglasses is an optical head-mounted display device designed in the shape of a pair of eyeglasses. For example, smartglasses are glasses that add information (e.g., project a display) alongside what the wearer views through the glasses. An example of a wearable device 114 configured as smartglasses is explained later in the disclosure with reference to FIG. 2. The wearable device 114 includes a display (e.g., display 207 of FIG. 2) that is projected onto the field of view of the user. The display may include a liquid crystal display (LCD), a light-emitting diode (LED) display, an organic light-emitting display (OLED), an electro-phoretic display (EPD), or a micro-projection display adopting an LED light source. In some examples, the display may provide a transparent or semi-transparent display such that the user wearing the glasses can see images provided by the display but also information located in the field of view of the smartglasses behind the projected images. In some examples, this disclosure may refer to smartglasses, but the embodiments may be applied to other types of wearable computing devices and/or combinations of mobile/wearable computing devices working together.

An eye tracker 125 is a device for measuring eye position and/or eye movement. The eye tracker 125 can detect the presence, attention, and/or focus of the user. In some examples, the eye tracker 125 can measure the point of gaze (e.g., where one is looking) and/or the motion of an eye relative to the head. The eye tracker 125 may include a plurality of eye tracker components 130 that are positioned on the wearable device 114 to enable the eye tracker 125 to measure the eye position and/or eye movement. The eye tracker components may include one or more eye tracker sensors 138 and one or more light sources 140. The eye tracker sensor(s) 138 may include camera(s) configured to capture image data. The light source(s) 140 may include light-emitting diode (LED)-based light sources. Based on the information received via the eye tracker sensor(s) 138, the eye tracker 125 is configured to measure eye position and track its movement. The eye tracker components 130 may be positioned at different locations on the wearable device 114. In the case of smartglasses, the eye tracker components 130 may be positioned on different locations of the frame. However, the placement of the eye tracker components 130 on the wearable device 114 may affect the performance of the eye tracker 125.

The wearable device design system 100 includes one or more processors 144, which may be formed in a substrate configured to execute one or more machine executable instructions or pieces of software, firmware, or a combination thereof. The processors 144 can be semiconductor-based—that is, the processors can include semiconductor material that can perform digital logic. The wearable device design system 100 can also include one or more memory devices 146. The memory devices 146 may include any type of storage device that stores information in a format that can be read and/or executed by the processor(s) 144. The memory device(s) 146 may store executable instructions that when executed by the processor(s) 144 cause the processor(s) 144 to perform any of the operations discussed herein. The memory devices 146 may store one or more databases (e.g., head model database 106, wearable device database 112, performance database 118, etc.). In some examples, the memory device(s) 146 can store information received or generated by the wearable device design system 100. In some examples, the memory devices 146 may include applications and modules (e.g., model generator 104, data analyzer 122, eye tracking evaluator 124, data selector 126, sizing simulator 132, synthetic eye generator 134, component placer 136, etc.) that, when executed by the processor(s) 144, perform the operations discussed herein. In some examples, the applications and modules may be stored in an external storage device and loaded into the memory devices 146.

The wearable device design system 100 includes a data selector 126 configured to communicate with a head model database 106 and a wearable device database 112. The head model database 106 may store a plurality of 3D models 110 that correspond to a plurality of head samples 108. Each 3D model 110 corresponds to a separate head sample 108. The head model database 106 may store a wide variety of head samples 108 in the form of 3D models 110. A 3D model 110 includes 3D image data of at least a head of a person. In some examples, the 3D models 110 were previously created, and the 3D models 110 are incorporated into the head model database 106 to be used for designing an eye tracker 125 on a wearable device 114. In some examples, the wearable device design system 100 includes a model generator 104 configured to create a 3D model 110 based on image data 102. In some examples, the model generator 104 may receive image data 102 via one or more cameras and then create the 3D models 110. The wearable device database 112 may store a plurality of 3D models 116 that correspond to a plurality of wearable devices 114. Each 3D model 116 corresponds to a separate wearable device 114. A 3D model 116 includes 3D image data representing a particular wearable device 114. In some examples, the 3D models 116 are different types (e.g., models, SKUs) of wearable devices 114.

The data selector 126 selects a 3D model 110 representing a head sample 108 from the head model database 106 and selects a 3D model 116 representing a wearable device 114 from the wearable device database 112. In some examples, the data selector 126 may select the first head sample 108 from the head model database 106 (and then select other head samples 108 after the first head sample 108 is evaluated). In some examples, the data selector 126 may randomly select the head sample 108 from the head model database 106. In some examples, the user may instruct the data selector 126 to select a particular head sample 108 from the head model database 106. In some examples, the user instructs the data selector 126 to select a particular wearable device 114. In some examples, the data selector 126 may select a particular wearable device 114 and then generate performance data 120 for each of (or a subset of) of the head samples 108.

The wearable device design system 100 includes a synthetic eye generator 134 that generates and positions synthetic eye(s) 128 within the 3D model 110. For example, the 3D model 110 may not necessarily include information that depicts the features of the eye of a particular head sample 108. However, the synthetic eye generator 134 may generate and position synthetic eye(s) 128 within the 3D model 110 representing a head sample 108. For example, a 3D center point of the eyeball may be derived from the 3D pupil positions (e.g., having a particular depth). The synthetic eye generator 134 may position the synthetic eye 128 into the 3D model 110 such that a center of the synthetic eye 128 is placed into the already existing eyeball center (e.g., derived from the 3D pupil positions), and its pupil placed approximately in the pre-existing pupil location (e.g., with some deviation based on the various eyeball sizes that are simulated). A synthetic eye 128 may be a representation of an eye-image having visible features of a realistic eye such as pupil, iris, cornea, and/or sclera. In some examples, the synthetic eye 128 is a 3D eyeball. In some examples, the synthetic eye 128 includes image features representing eyelids and image features representing eyelashes. For example, the synthetic eye generator 134 may generate different shapes and sizes of eyelids, which can affect the performance of eye tracking. For example, eyelids and eye lashes and how they move with gaze as part of the synthetic eye 128 may affect what aspects of the eye are visible. In some examples, the synthetic eye generator 134 can vary the whiteness of the scleras, adding in darker spots and/or blood vessels. In some examples, the synthetic eye(s) 128 are positioned in the 3D model 110 at a location of the image data that represents a person's eye(s). During the evaluation of the eye tracker 125, in some examples, the synthetic eye generator 134 may adjust one or more features of the synthetic eye 128 to determine the impact on the eye tracker's performance.

The wearable device design system 100 includes a component placer 136 that positions one or more eye tracker components 130 on the 3D model 116. For example, a user may use the component placer 136 to position one or more eye tracker sensors 138 and/or one or more light sources 140 on the 3D model 116. In some examples, the component placer 136 is configured to programmatically position one or more eye tracker sensors 138 and/or one or more light sources 140 on the 3D model 116.

The wearable device design system 100 includes a sizing simulator 132 that simulates a placement of the 3D model 110 with the positioned eye tracker components 130 on the 3D model 110 having the synthetic eyes 128. The sizing simulator 132 may receive the 3D model 110 and the 3D model 116 and then position the 3D model 116 on the 3D model 110 such that the 3D model 116 and the 3D model 110 contact each other. In some examples, the sizing simulator 132 may move at least one of the 3D model 110 or the 3D model 116 such that at least a portion of the 3D model 116 contacts at least a portion of the 3D model 110. In some examples, a portion of the 3D model 110 contacting a portion of the 3D model 116 may refer to image data representing a surface in 3D model 110 at least partially intersects with image data representing a surface in 3D model 116. In the case of smartglasses, in some examples, the sizing simulator 132 may position the smartglasses on the face of the head sample where the frames contact the nose and fit behind the ears. In some examples, the smartglasses are positioned a certain distance away from the face, and the sizing simulator 132 may iteratively perform the following operations until convergence: tilt the smartglasses to rest on the ears, bend the smartglasses to clear the temples, move the smartglasses to the nose, and recenter the smartglasses to maintain contact with both sides of the nose.

In some examples, the sizing simulator 132 places the glasses on the head in the way they actually sit on the head, so therefore the view of the eye is not merely theoretical, but can be used to bypass the need to put glasses on real people's heads. Also, the sizing simulator 132 may remove all the non-fit data, thereby avoiding eye tracking accommodation when the glasses would not fit the person anyway (e.g., too loose or too tight).

In some examples, the sizing simulator 132 may determine contact points (e.g., contact points 313 of FIGS. 3A through 3C) between the 3D model 110 and the 3D model 116. The contact points may be the coordinates in 3D space at which the 3D model 116 contacts the 3D model 110 when the wearable device 114 is placed on the head sample 108 (e.g., how the wearable device 114 can be worn on the head sample 108). In some examples, the sizing simulator 132 uses one or more machine-learning (ML) models to predict the contact points. For example, the ML model may predict the contact points based on the 3D model 110 and the 3D model 116. In some examples, the contact points may be the points where the bridge portion (e.g., bridge portion 273 of FIG. 2) of the frame (e.g., frame 271 of FIG. 2) of the wearable device 114 contacts the bridge of the person's nose, the points where the arm portions (e.g., arm portions 274 of FIG. 2) of the wearable device 114 rest on the person's ears, and/or the points where the arm portions (e.g., arm portions 274 of FIG. 2) contact the person's temples.

A ML model includes a neural network. The ML model may be an interconnected group of nodes, each node representing an artificial neuron. The nodes are connected to each other in layers, with the output of one layer becoming the input of a next layer. The ML model transforms an input, received by the input layer, transforms it through a series of hidden layers, and produces an output via the output layer. Each layer is made up of a subset of the set of nodes. The nodes in hidden layers are fully connected to all nodes in the previous layer and provide their output to all nodes in the next layer. The nodes in a single layer function independently of each other (i.e., do not share connections). Nodes in the output provide the transformed input to the requesting process. In some examples, the ML model is a convolutional neural network, which is a neural network that is not fully connected. Convolutional neural networks therefore have less complexity than fully connected neural networks. Convolutional neural networks can also make use of pooling or max-pooling to reduce the dimensionality (and hence complexity) of the data that flows through the neural network and thus this can reduce the level of computation required. This makes computation of the output in a convolutional neural network faster than in neural networks.

In some examples, the sizing simulator 132 is configured to compute a wearable fit value based on the simulation and/or contact points, where the wearable fit value represents a level of wearable fit of the wearable device 114 on the head of the person. In some examples, a wearable fit value above a threshold level may indicate that the wearable device 114 can properly fit and be worn on the person represented by the 3D model 110.

In addition, in some examples, the sizing simulator 132 is configured to compute the wearable fit value based on wearable fit parameters such as whether the frame (e.g., frame 271 of FIG. 2) of the wearable device 114 is wide enough to be comfortable with respect to the user's temples, whether the rim portions (e.g., rim portions 209 of FIG. 2) and bridge portion (e.g., bridge portion 273 of FIG. 2) are sized so that the bridge portion (e.g., bridge portion 273 of FIG. 2) can rest comfortably on the bridge of the user's nose, whether the arm portions (e.g., arm portions 274) are sized to comfortably rest on the user's ears, and other such comfort related considerations. The calculation of the wearable fit value may also account for wearable fit parameters relating to as-worn parameters including how the user naturally wears the wearable device 114, such as, for example, head posture/how the user naturally holds his/her head, how the user positions the wearable device 114 relative to his/her face, and the like. The calculation of the wearable fit value may also account for wearable fit parameters relating to whether the size and/or shape and/or contour of the frame (e.g., frame 271 of FIG. 2) is aesthetically pleasing to the user and is compatible with the user's facial features.

The sizing simulator 132 may be configured to calculate a display fit value based on the simulation and/or contact points, where the display fit value represents an amount of the display (e.g., display 207 of FIG. 2) projected by the wearable device 114 that can be viewed by the person. A display fit value above a threshold level may indicate that the display projected by the wearable device 114 can be substantially viewed by the user. In some examples, the sizing simulator 132 is configured to detect features such as pupil locations and ear saddle points based on the 3D model 110. The sizing simulator 132 is configured to compute the display fit value using the contact points and other display fit parameters (or measurements) such as the pupil locations and ear saddle points.

The wearable device design system 100 includes an eye tracking evaluator 124 configured to generate performance data 120 that includes information associated with an evaluation of the eye tracker 125. For example, the eye tracking evaluator 124 may evaluate the accuracy of the eye tracker 125 with the eye tracker components 130 positioned on the 3D model 116 of the wearable device 114. The performance data 120 may include any type of data that indicates the accuracy of detecting and/or tracking the position of the synthetic eyes 128. In some examples, the performance data 120 includes information indicating an amount of the synthetic eye 128 that is visible via the eye tracker sensor(s) 138. For example, if the eye tracker sensor(s) 138 is/are able to capture a substantial portion of the synthetic eye 128, the accuracy of the eye tracker 125 may be improved. In some examples, the performance data 120 indicates the amount of pupil of the synthetic eye 128 that is visible via the eye tracker sensor(s) 138. In some examples, the performance data includes signal levels such the presence (or level) of dim spots, obstructions (e.g., clippings), and/or illumination levels. In some examples, the signal levels include a signal level relating to an obstruction between the camera and the eye, which can be caused by eyelashes or the angle of the camera having some part of the device (e.g., glasses) obstructing the field of view. In some examples, the performance data includes the amount of eyelids (e.g., upper and/or lower) that is obstructing the iris/pupil. In some examples, the eye tracking evaluator 124 may store the performance data 120 in a performance database 118.

The component placer 136 may move the eye tracker components 130 to different locations 150 (e.g., programmatically or directed by the user), and the eye tracking evaluator 124 may re-generate the performance data 120 with the eye tracker components 130 at the new locations 150. In some examples, the component placer 136 may adjust the viewing angle 148 of one or more of the eye tracker sensors 138 (e.g., programmatically or directed by the user) and the eye tracking evaluator 124 may re-generate the performance data 120 using the different viewing angles 148. In some examples, the component placer 136 may add one or more additional eye tracker sensors 138 and/or one or more light sources 140 (e.g., programmatically or directed by the user), and the eye tracking evaluator 124 may evaluate the performance of the eye tracker 125 with the additional eye tracker sensors 138 and/or light sources 140.

Referring to FIGS. 1A and 1B, the component placer 136 may position an eye tracker sensor 138 at a location 150a on the 3D model 116 associated with the wearable device 114, and the eye tracking evaluator 124 may generate performance data 120 with the eye tracker sensor 138 at the location 150a. Then, the user may use the component placer 136 to position an eye tracker sensor 138 at a location 150b on the 3D model, and the eye tracking evaluator 124 may re-generate performance data 120 with the eye tracker sensor 138 at the location 150b. In some examples, the component placer 136 may position a light source 140 at a location 150c on the 3D model 116 associated with the wearable device 114, and the eye tracking evaluator 124 may generate performance data 120 with the light source 140 at the location 150c. Then, the component placer 136 may move the light source 140 to a location 150d, and the eye tracking evaluator 124 may re-generate the performance data 120 with the light source 140 at the location 150d.

In some examples, the synthetic eye generator 134 may adjust one or more synthetic eye parameters 129 such as size of the synthetic eye 128, size of the pupil, shape/size of the iris, and/or color of the iris (shape of cornea). In some examples, the synthetic eye generator 134 may adjust the eyelids, eyelashes, or other parts associated with the synthetic eye 128. The eye tracking evaluator 124 may evaluate the performance of the eye tracker 125 using different values for the synthetic eye parameters 129. In the case of smartglasses, the wearable device 114 may include prescription lens (e.g., corrective lens). The component placer 136 may be configured to adjust the parameters of the lens to meet different types of prescriptions, and the eye tracking evaluator 124 may evaluate the performance of the eye tracker 125 using the different lens parameters. In some examples, the lens parameters may include the thickness of the lens and/or the curvature of the inner/outer lens in either direction. In some examples, the lens parameters may include features associated with bifocals and/or progressive prescription lenses.

In some examples, the wearable device design system 100 is configured to adjust one or more parameters associated with the display (e.g., display 207 of FIG. 2) and evaluate its impact on the eye tracker 125. For example, the display may be associated with display optical parameters, such as properties of the waveguide, which could also be adjusted to determine the impact of the waveguide on the eye tracker 125. In addition, properties of the display (e.g., display 207 of FIG. 2) may include UI vector, display size, eyebox size, which may impact where the eye may be positioned relative to the eye tracker 125 and could be used to inform design decisions and accommodation. For example, the wearable device design system 100 can adjust the UI vector, the display size, and/or the eyebox size, etc., and determine their impact on the eye tracker 125.

In some examples, the wearable device design system 100 is configured to select other head samples 108 from the head model database 106 and generate performance data 120 for the eye tracker 125 using the operations as describe above. For example, the data selector 126 may select another 3D model 110 from the head model database 106, and the synthetic eye generator 134 may generate and position synthetic eyes 128 within the 3D model 110. In some examples, the 3D model 116 that was used in the previous iteration is used for the subsequent head sample 108. The sizing simulator 132 may simulate the placement on the 3D model 116 on the 3D model 110, and the eye tracking evaluator 124 may generate performance data 120 using the new head sample 108. The user may use the component placer 136 to adjust the location 150 and/or viewing angle 148 of the eye tracker components 130. Also, the user may use the synthetic eye generator 134 to adjust the synthetic eye parameters 129. In some examples, the wearable device design system 100 may generate performance data 120 for all of the head samples 108 (or a subset thereof) in the head model database 106.

In some examples, the wearable device design system 100 includes a data analyzer 122 configured to analyze the performance data 120 in the performance database 118 across the different head samples 108. In some examples, the data analyzer 122 may determine the location 150 and viewing angle 148 of the eye tracker components 130 such that the performance of the eye tracker 125 is maximized across a number of head samples 108. In some examples, the data analyzer 122 may identify the number of eye tracker components 130 and their locations 150 such that the amount of synthetic eye 128 (e.g., pupil) that is visible by the eye track sensors 138 is maximized.

Figure 2:
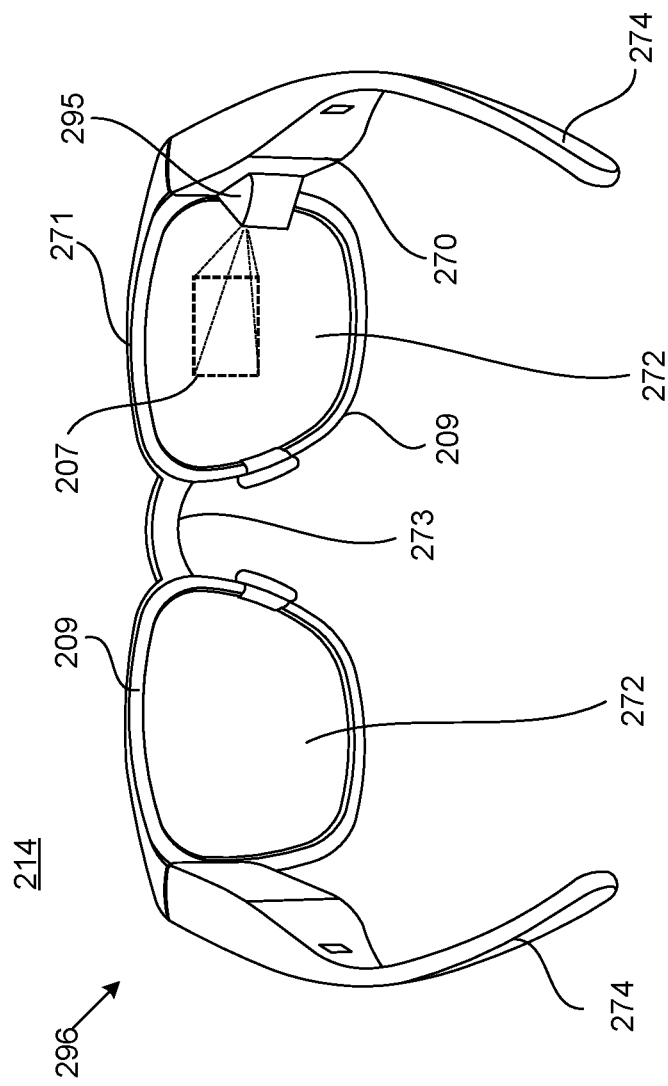
FIG. 2 illustrates a head-mounted display device according to an aspect.

FIG. 2 illustrates an example of a wearable device 214. The wearable device 214 may be an example of the wearable device 114 of FIGS. 1A and 1B and may include any of the details discussed with reference to those figures.

In some examples, referring to FIG. 2, the wearable device 214 may include smartglasses 296. Smartglasses 296 are glasses that add information (e.g., project a display 207) alongside what the wearer views through the glasses. For example, the smartglasses 296 may include a display device 295 configured to project the display 207. In some examples, the display device 295 may include a see-through near-eye display. For example, the display device 295 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 272, next to content (for example, digital images, user interface elements, virtual content, and the like) generated by the display device 295. In some implementations, waveguide optics may be used to depict content on the display device 295.

In some examples, instead of projecting information, the display 207 is an in-lens micro display. In some examples, the display 207 is referred to as an eye box. In some examples, smartglasses 296 (e.g., eyeglasses or spectacles), are vision aids, including lenses 272 (e.g., glass or hard plastic lenses) mounted in a frame 271 that holds them in front of a person's eyes, typically utilizing a bridge portion 273 over the nose, and arm portions 274 (e.g., which may include temples or temple pieces) which rest over the ears. The bridge portion 273 may connect rim portions 209 of the frame 271. The smartglasses 296 include an electronics component 270 that includes circuitry of the smartglasses 296. In some examples, the electronics component 270 is included or integrated into one of the arm portions 274 (or both of the arm portions 274) of the smartglasses 296.

The smartglasses 296 can also include an audio output device (such as, for example, one or more speakers), an illumination device, a sensing system, a control system, at least one processor, and an outward facing image sensor, or camera. In some examples, the smartglasses 296 may include a gaze tracking device including, for example, one or more sensors, to detect and track eye gaze direction and movement. Data captured by the sensor(s) may be processed to detect and track gaze direction and movement as a user input. In some examples, the sensing system may include various sensing devices and the control system may include various control system devices including, for example, one or more processors operably coupled to the components of the control system. In some implementations, the control system may include a communication module providing for communication and exchange of information between the wearable computing device and other external devices.

Referring to FIGS. 1A, 1B, and 2, the wearable device design system 100 of FIGS. 1A and 1B may use a 3D model 116 of the smartglasses 296 of FIG. 2 to identify the location of eye tracker components 130 on the frame 271 of the smartglasses 296. In some examples, the eye tracker components 130 may be positioned (and re-positioned) on the arm portions 274, the rim portions 209, and/or the bridge portion 273. The wearable device design system 100 of FIGS. 1A and 1B may identify the location(s) 150 and viewing angle(s) 148 of the eye tracker sensor(s) 138 and the light source(s) 140 in a manner that can increase the accuracy of the eye tracker 125 across a number of different users.

Figure 3A:
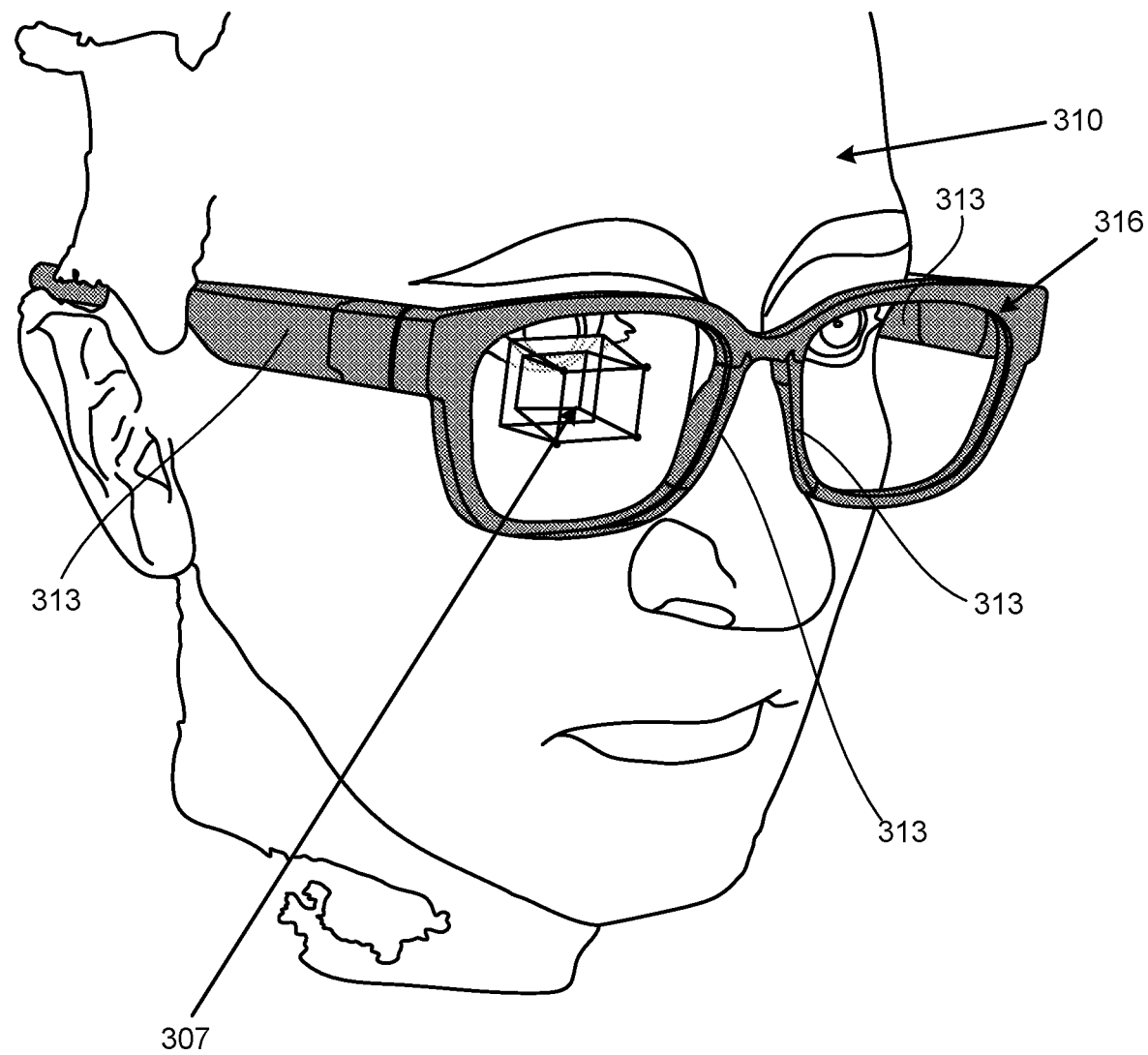
FIGS. 3A through 3C illustrate a placement of a 3D model associated with a wearable device on a 3D model associated with a head sample according to an aspect.
Figure 3B:
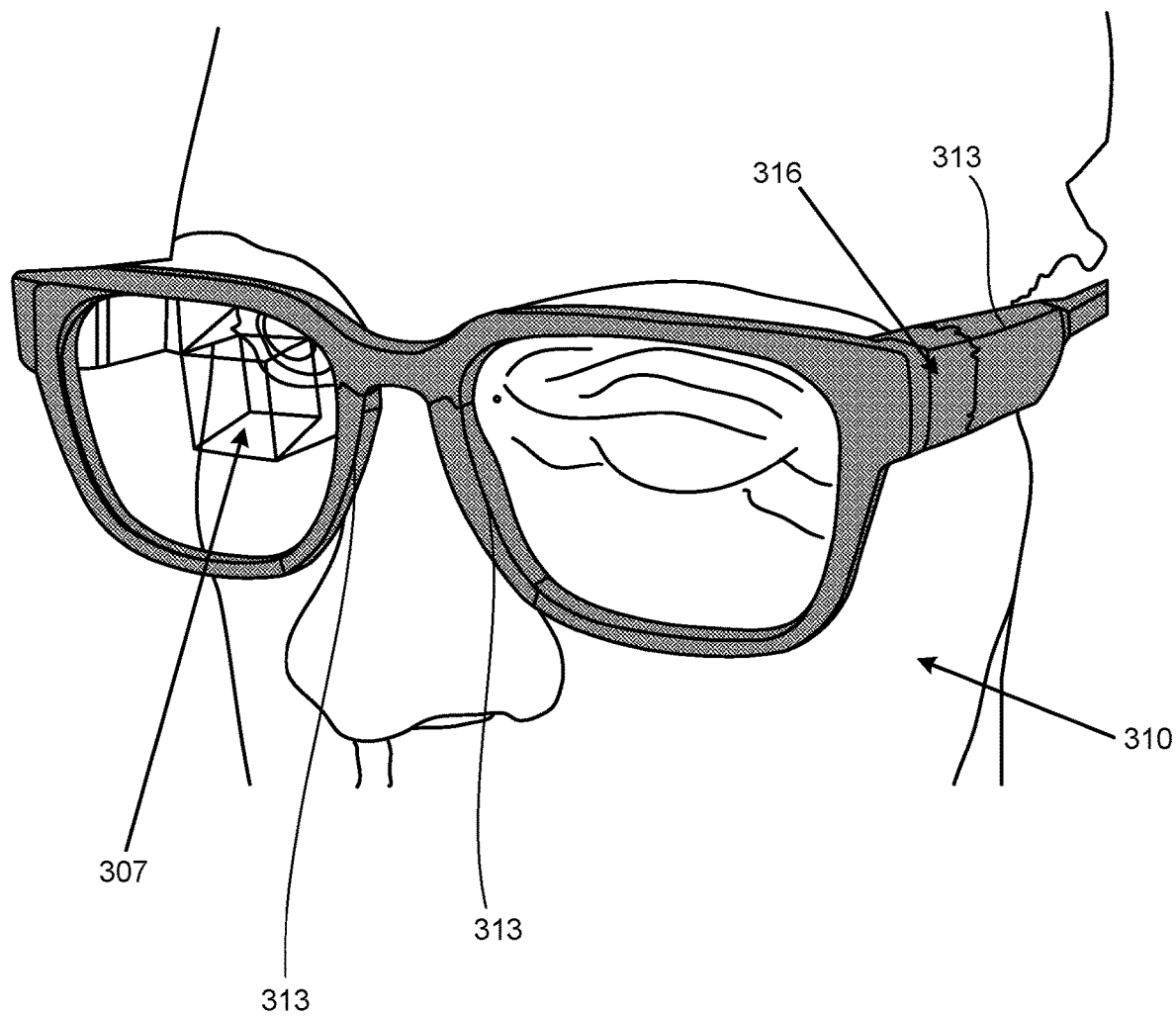
Figure 3C:
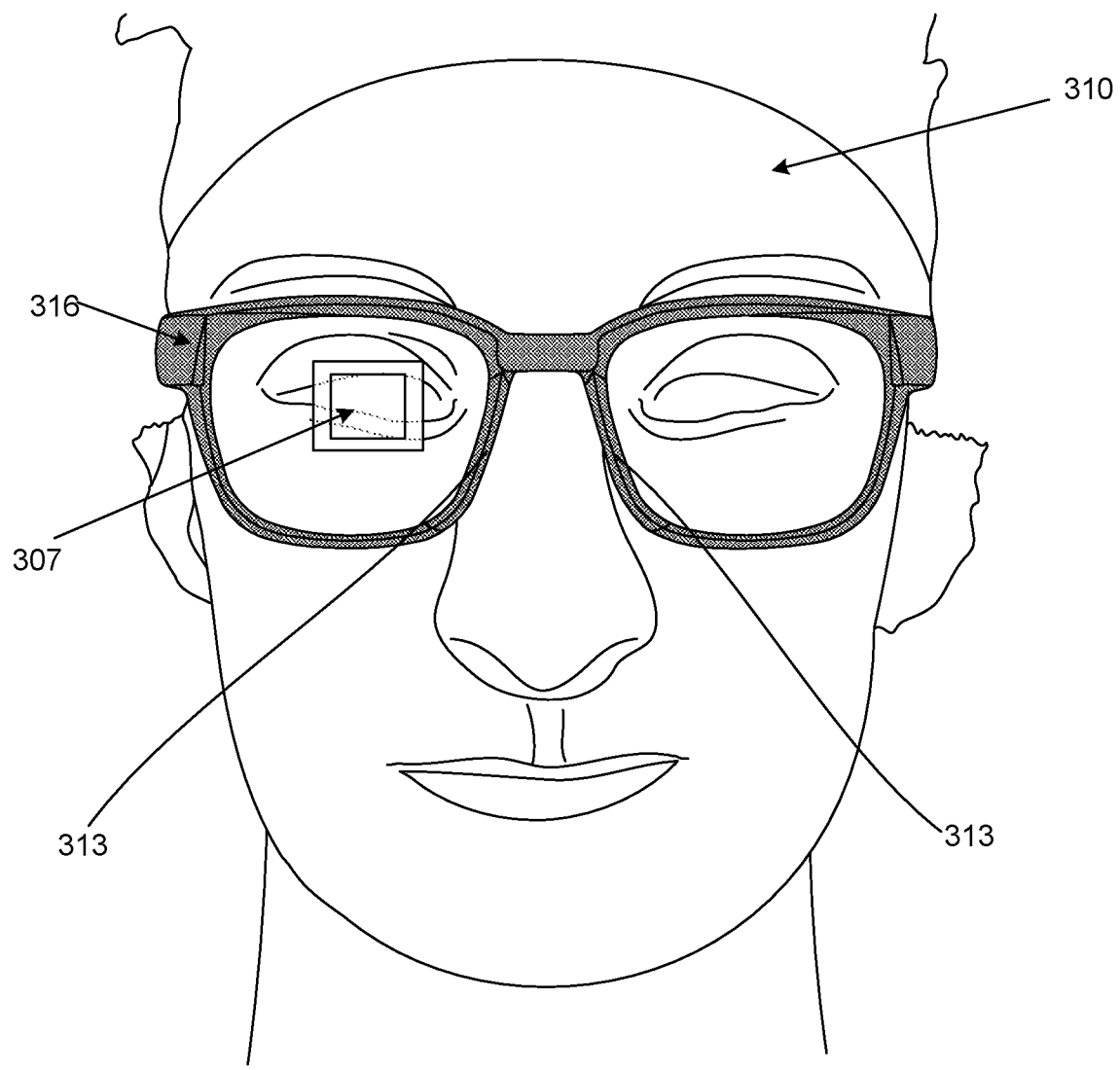

FIGS. 3A through 3C illustrate an example output of a sizing simulator 132 of FIGS. 1A and 1B. For example, a 3D model 316 of a wearable device may be positioned on a 3D model 310 of a head sample. The 3D model 316 may be a 3D model of the smartglasses 296 of FIG. 2, which is configured to project a display 307. Although not shown in FIGS. 3A through 3C, the 3D model 310 includes synthetic eyes (e.g., synthetic eyes 128 of FIG. 1A) positioned within the head sample. In some examples, as explained above, contact points 313 are predicted between the 3D model 310 associated with at least a head of a person and a 3D model 316 associated with a wearable device (e.g., smartglasses 296 of FIG. 2). The contact points 313 may be the coordinates in 3D space at which the 3D model 316 contacts the 3D model 310 when the wearable device is placed on the user's head. In some examples, the sizing simulator 132 of FIGS. 1A and 1B generates a graphical representation of the placement, as shown in FIGS. 3A through 3C.

Figure 4:
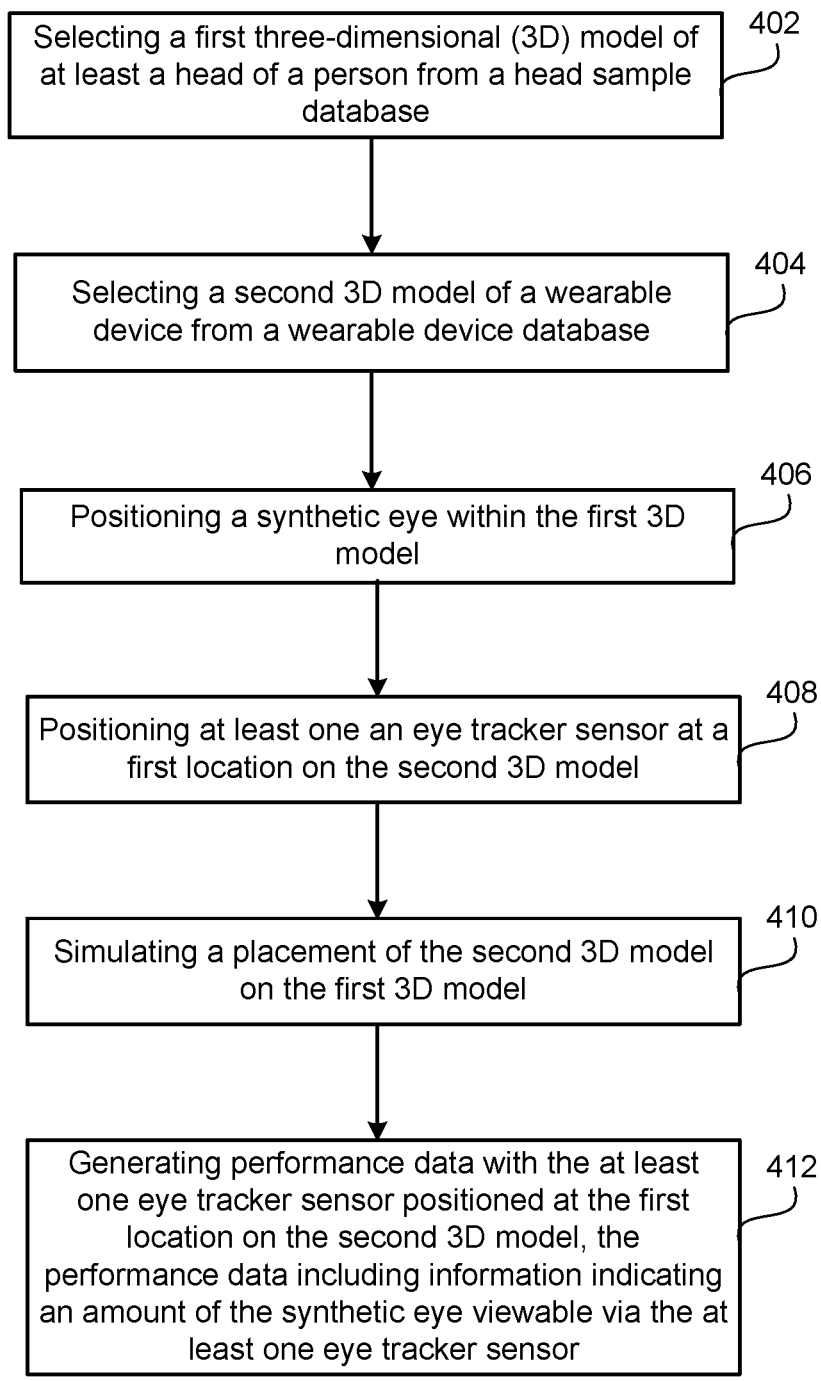
FIG. 4 illustrates a flowchart depicting example operations of a wearable device design system according to an aspect.

FIG. 4 illustrates a flowchart 400 depicting example operations of the wearable device design system 100 of FIGS. 1A and 1B. Although the flowchart 400 is described with reference to the wearable device design system 100 of FIGS. 1A and 1B, the flowchart 400 may be applicable to any of the embodiments herein. Although the flowchart 400 of FIG. 4 illustrates the operations in sequential order, it will be appreciated that this is merely an example, and that additional or alternative operations may be included. Further, operations of FIG. 4 and related operations may be executed in a different order than that shown, or in a parallel or overlapping fashion.

Operation 402 includes selecting a first three-dimensional (3D) model 110 of at least a head of a person from a head sample database 106. Operation 404 includes selecting a second 3D model 116 of a wearable device 114 from a wearable device database 112. Operation 406 includes positioning a synthetic eye 128 within the first 3D model 110. Operation 408 includes positioning an eye tracker sensor 138 at a first location 150a on the second 3D model 116. Operation 410 includes simulating a placement of the second 3D model 116 on the first 3D model 110. In some examples, the simulating includes moving at least one of the first 3D model 110 or the second 3D model 116 such that the second 3D model 116 contacts the first 3D model 110. Operation 412 includes generating performance data 120 with the eye tracker sensor 138 positioned at the first location 150a on the second 3D model 116, where the performance data 120 includes information associated with the performance of an eye tracker 125 using the synthetic eye 128.

Figure 5:
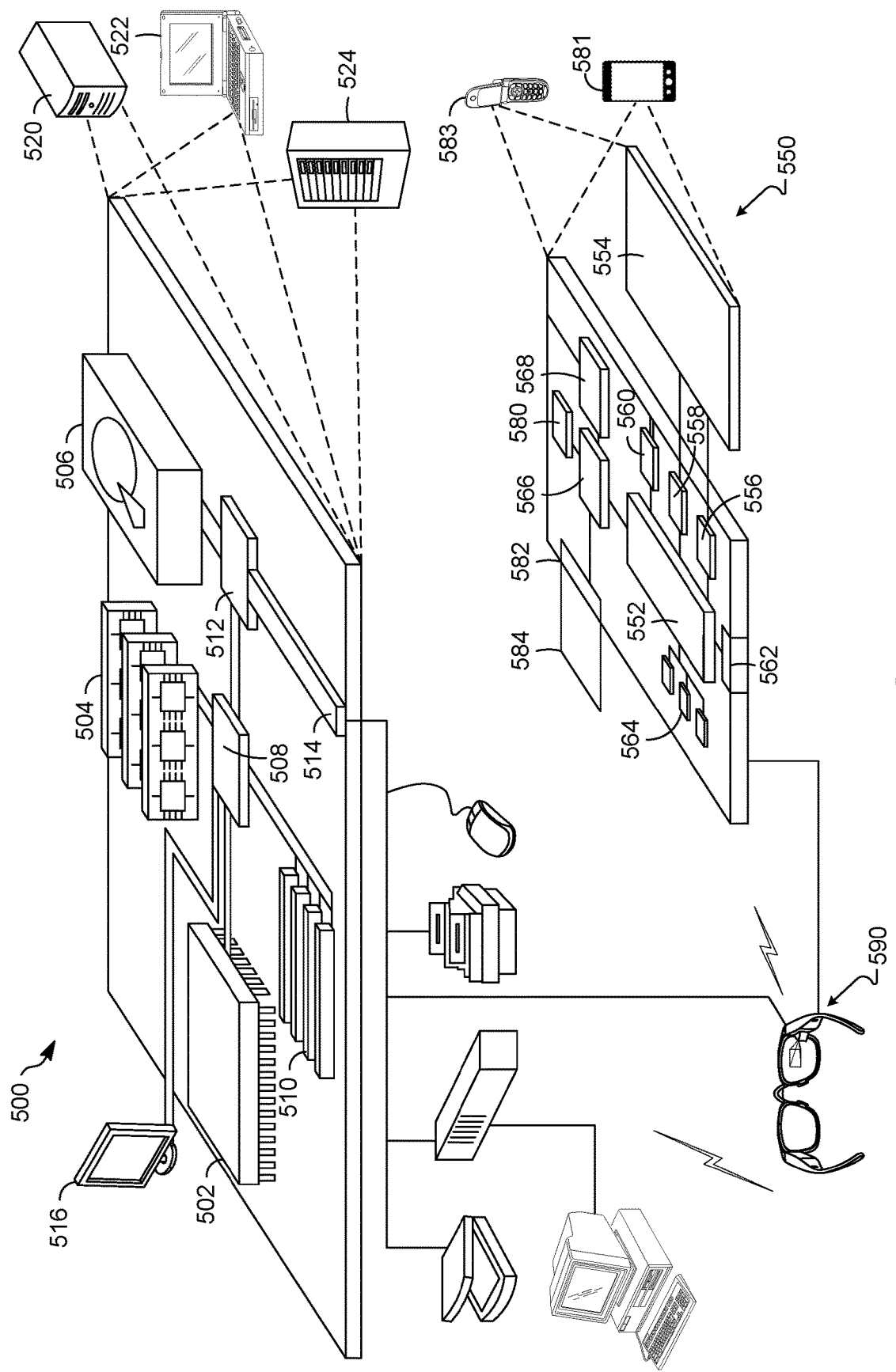
FIG. 5 illustrates example computing devices of the computing systems discussed herein according to an aspect.

FIG. 5 shows an example of an example computer device 500 and an example mobile computer device 550, which may be used with the techniques described here. Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. In addition, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing devices 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550 or may also store applications or other information for device 550. Specifically, expansion memory 574 may include instructions to carry out or supplement the processes described above and may include secure information also. Thus, for example, expansion memory 574 may be provided as a security module for device 550 and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, Wi-Fi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or another similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. In addition, the term "module" may include software and/or hardware.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 5 can include sensors that interface with a virtual reality (VR headset 590). For example, one or more sensors included on a computing device 550 or other computing device depicted in FIG. 5, can provide input to VR headset 590 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 550 can use the sensors to determine an absolute position and/or a detected rotation of the computing device in the VR space that can then be used as input to the VR space. For example, the computing device 550 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connected to, the computing device 550 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 550 when the computing device is incorporated into the VR space can cause a particular action to occur in the VR space.

In some implementations, a touchscreen of the computing device 550 can be rendered as a touchpad in VR space. A user can interact with the touchscreen of the computing device 550. The interactions are rendered, in VR headset 590 for example, as movements on the rendered touchpad in the VR space. The rendered movements can control objects in the VR space.

In some implementations, one or more output devices included on the computing device 550 can provide output and/or feedback to a user of the VR headset 590 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 550 may appear as another object in a computer-generated, 3D environment. Interactions by the user with the computing device 550 (e.g., rotating, shaking, touching a touchscreen, swiping a finger across a touch screen) can be interpreted as interactions with the object in the VR space. In the example of the laser pointer in a VR space, the computing device 550 appears as a virtual laser pointer in the computer-generated, 3D environment. As the user manipulates the computing device 550, the user in the VR space sees movement of the laser pointer. The user receives feedback from interactions with the computing device 550 in the VR space on the computing device 550 or on the VR headset 590.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A wearable device design system comprising:
   at least one processor; and
   a non-transitory computer-readable medium storing executable instructions that when executed by the at least one processor cause the at least one processor to:
   select a first three-dimensional (3D) model of at least a head of a person from a head sample database;
   select a second 3D model of a wearable device from a wearable device database;
   position a synthetic eye within the first 3D model;
   position an eye tracker sensor at a first location on the second 3D model;
   move at least one of the first 3D model or the second 3D model such that at least a portion of the second 3D model contacts at least a portion of the first 3D model; and
   generate performance data with the eye tracker sensor positioned at the first location on the second 3D model, the performance data including information associated with performance of an eye tracker using the synthetic eye.

2. The wearable device design system of claim 1, wherein the performance data includes an amount of the synthetic eye that is visible via the eye tracker sensor.

3. The wearable device design system of claim 1, wherein the executable instructions include instructions that when executed by the at least one processor cause the at least one processor to:
move the eye tracker sensor from the first location to a second location; and
re-generate the performance data with the eye tracker sensor positioned at the second location.

4. The wearable device design system of claim 1, wherein the executable instructions include instructions that when executed by the at least one processor cause the at least one processor to:
adjust a viewing angle of the eye tracker sensor; and
re-generate the performance data with the eye tracker sensor according to the viewing angle.

5. The wearable device design system of claim 1, wherein the executable instructions include instructions that when executed by the at least one processor cause the at least one processor to:
adjust a synthetic eye parameter of the synthetic eye within the first 3D model.

6. The wearable device design system of claim 5, wherein the synthetic eye parameter includes at least one of size of eye, size of pupil, color of iris, shape of the iris or shape of cornea.

7. The wearable device design system of claim 1, wherein the executable instructions include instructions that when executed by the at least one processor cause the at least one processor to:
store the performance data in a performance database;
re-generate performance data for other head samples in the head sample database; and
identify a location of the eye tracker sensor based on an analysis of the performance database.

8. The wearable device design system of claim 1, wherein the executable instructions include instructions that when executed by the at least one processor cause the at least one processor to:
position a light source at a second location on the second 3D model,
wherein the performance data is generated with the eye tracker sensor positioned at the first location and the light source positioned at the second location.

9. The wearable device design system of claim 1, wherein the second 3D model includes a prescription lens, wherein the executable instructions include instructions that when executed by the at least one processor cause the at least one processor to:
adjust one or more parameters of the prescription lens.

10. The wearable device design system of claim 1, wherein the wearable device includes smartglasses configured to project a display, wherein the eye tracker sensor is positioned on a frame of the smartglasses at the first location.

11. A method for designing an eye tracker on a wearable device, the method comprising:
selecting a first three-dimensional (3D) model of at least a head of a person from a head sample database;
selecting a second 3D model of a wearable device from a wearable device database;
positioning a synthetic eye within the first 3D model;
positioning an eye tracker component at a first location on the second 3D model, the eye tracker component including at least one of an eye tracker sensor or a light source;
simulating a placement of the second 3D model on the first 3D model such that wearable device is positioned on the head of the person; and
generating performance data with the eye tracker component positioned at the first location on the second 3D model, the performance data including information associated with performance of an eye tracker using the synthetic eye.

12. The method of claim 11, wherein the performance data includes an amount of the synthetic eye that is visible via the eye tracker sensor.

13. The method of claim 11, further comprising:
adjusting a viewing angle of the eye tracker sensor; and
re-generating the performance data with the eye tracker sensor according to the viewing angle.

14. The method of claim 11, further comprising:
adjusting a synthetic eye parameter of the synthetic eye within the first 3D model, the synthetic eye parameter including at least one of eyelids or eyelashes.

15. The method of claim 11, further comprising:
storing the performance data in a performance database;
re-generating performance data for other head samples in the head sample database; and
identifying a location of the eye tracker component based on an analysis of the performance database.

16. The method of claim 11, further comprising:
adjusting one or more parameters of prescription lens associated with the wearable device.

17. A non-transitory computer-readable medium storing executable instructions that when executed by at least one processor cause the at least one processor to execute operations, the operations comprising:
selecting a first three-dimensional (3D) model of at least a head of a person from a head sample database;
selecting a second 3D model of a wearable device from a wearable device database;
positioning a synthetic eye within the first 3D model, the synthetic eye being an eye-image having image data representing a pupil;
positioning an eye tracker sensor at a first location on the second 3D model;
moving at least one of the first 3D model or the second 3D model such that at least a portion of the second 3D model contacts at least a portion of the first 3D model; and
generating performance data with the eye tracker sensor positioned at the first location on the second 3D model, the performance data including an amount of the pupil of the synthetic eye that is visible via the eye tracker sensor.

18. The non-transitory computer-readable medium of claim 17, wherein the operations further comprise:
moving the eye tracker sensor from the first location to a second location; and
re-generating the performance data with the eye tracker sensor positioned at the second location.

19. The non-transitory computer-readable medium of claim 17, wherein the operations further comprise:
adjusting a synthetic eye parameter of the synthetic eye within the first 3D model, the synthetic eye parameter including at least one of size of eye, size of pupil, color of iris, or shape of the iris.

20. The non-transitory computer-readable medium of claim 17, wherein the operations further comprise:
 storing the performance data in a performance database;
 re-generating performance data for other head samples in the head sample database; and
 identifying a location of the eye tracker sensor based on an analysis of the performance database.

\* \* \* \* \*